Sept. 28, 1971  H. J. JEFFERYS  3,608,256
STEP CONSTRUCTION
Original Filed Dec. 1, 1967  9 Sheets-Sheet 1
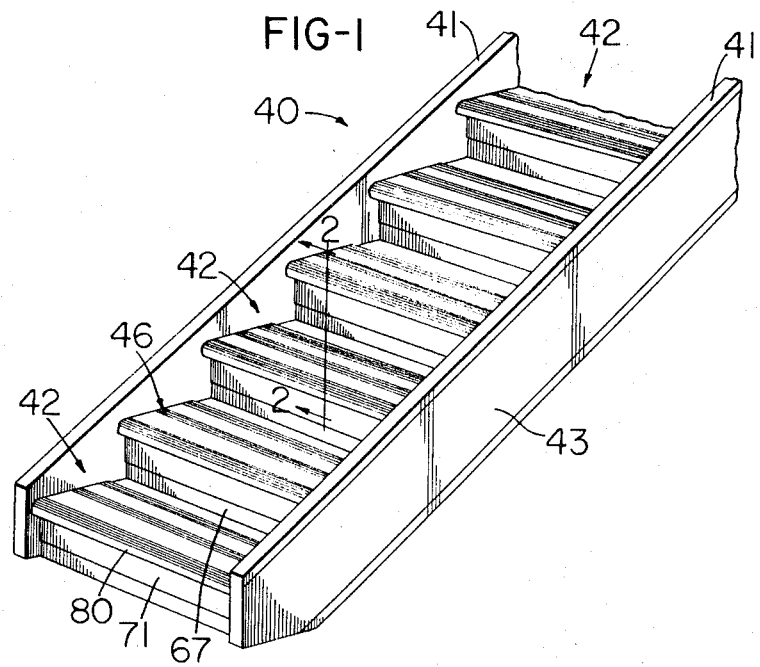
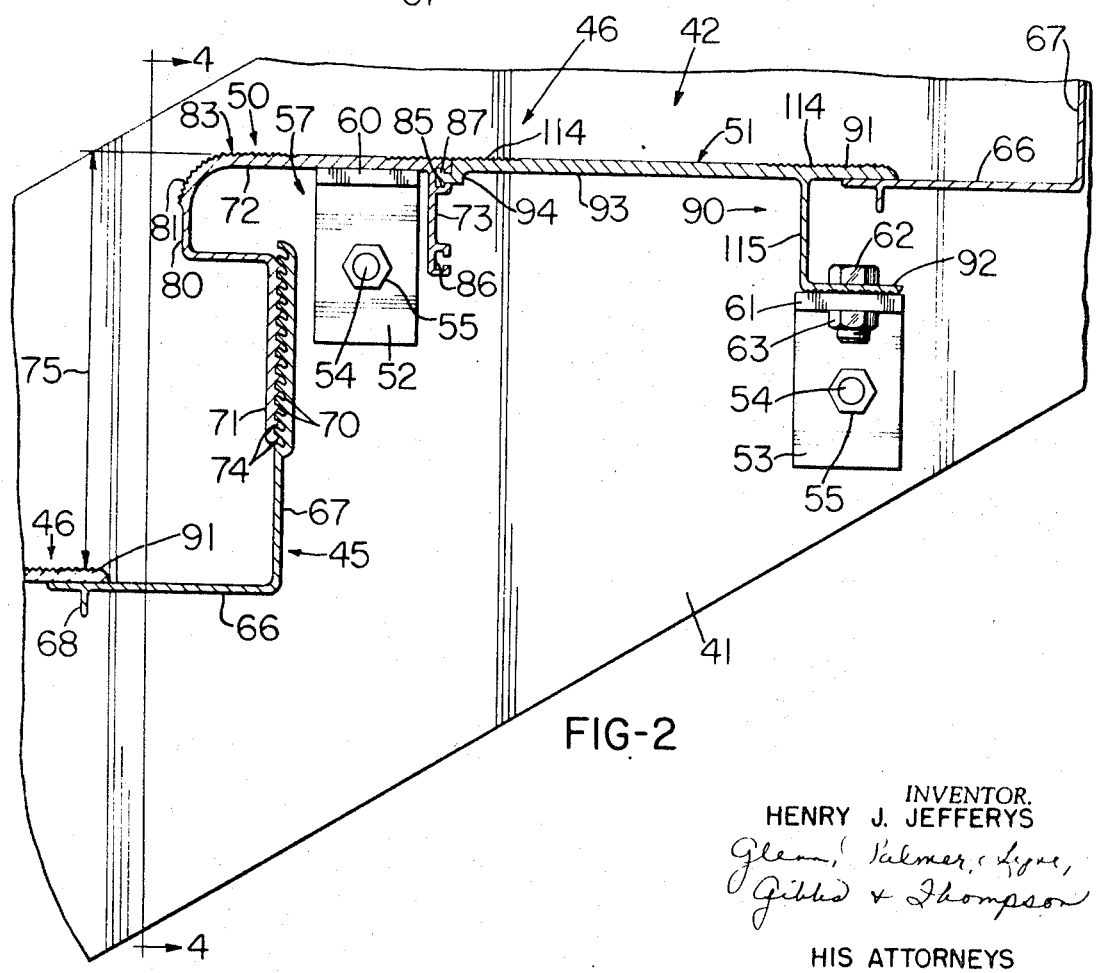
INVENTOR.
HENRY J. JEFFERYS
HIS ATTORNEYS Sept. 28, 1971  H. J. JEFFERYS  3,608,256
STEP CONSTRUCTION
Original Filed Dec. 1, 1967  9 Sheets-Sheet 2
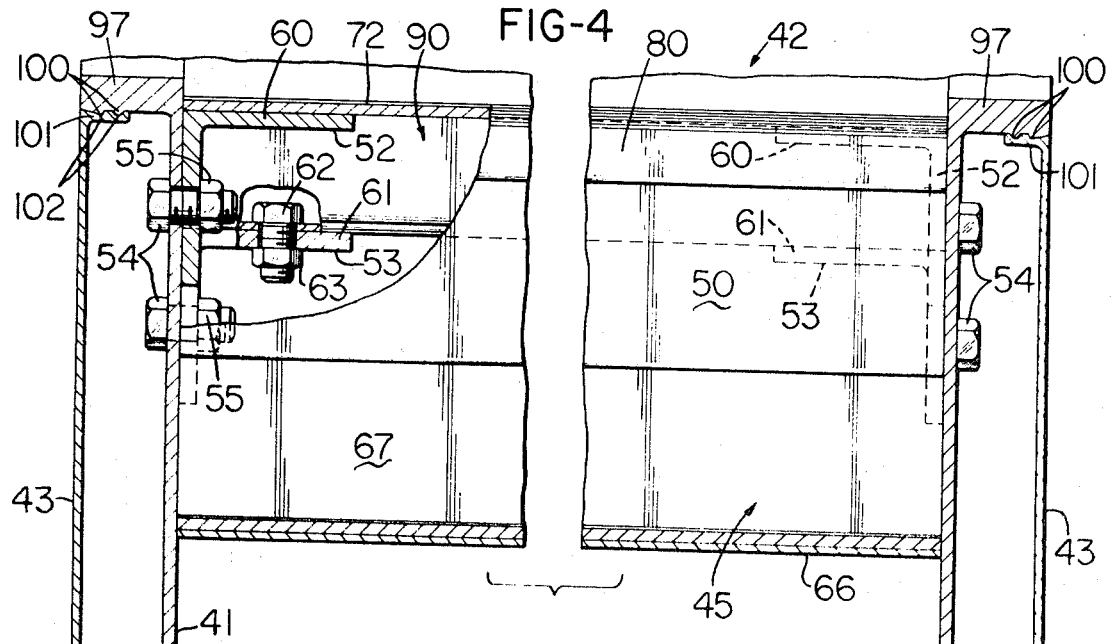
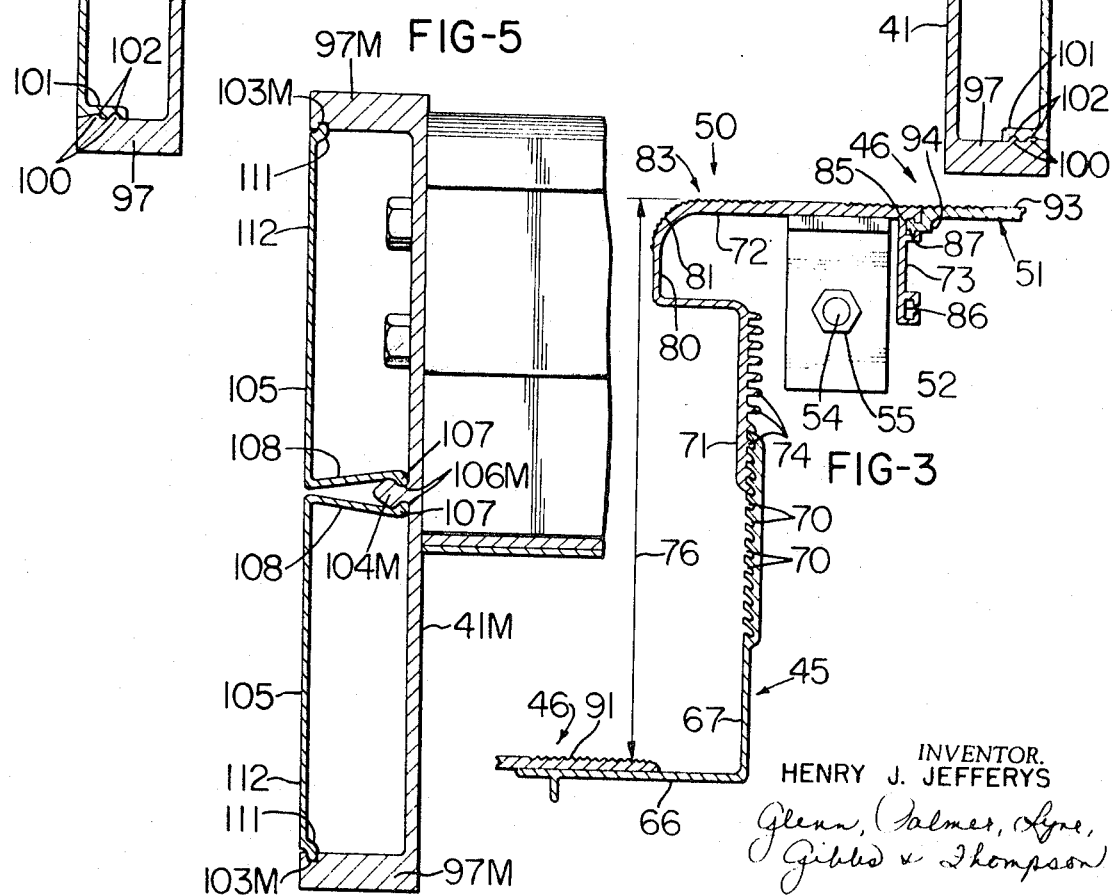
INVENTOR.
HENRY J. JEFFERYS
HIS ATTORNEYS

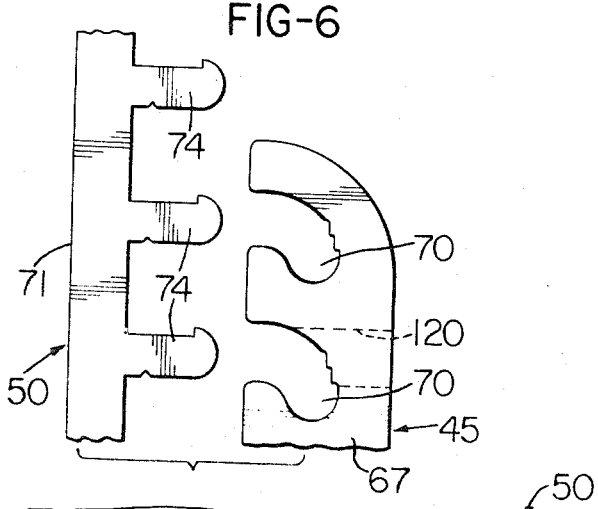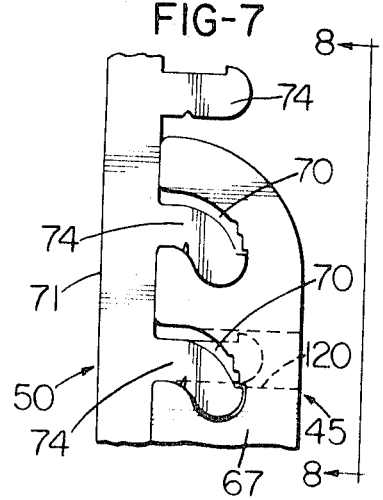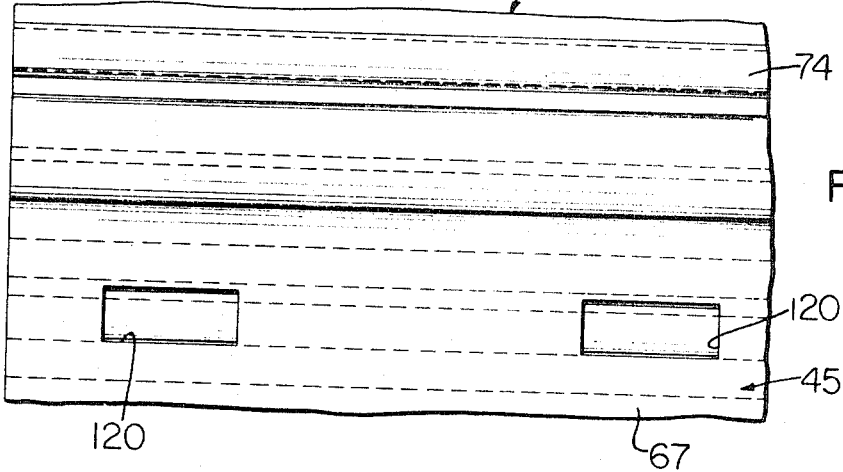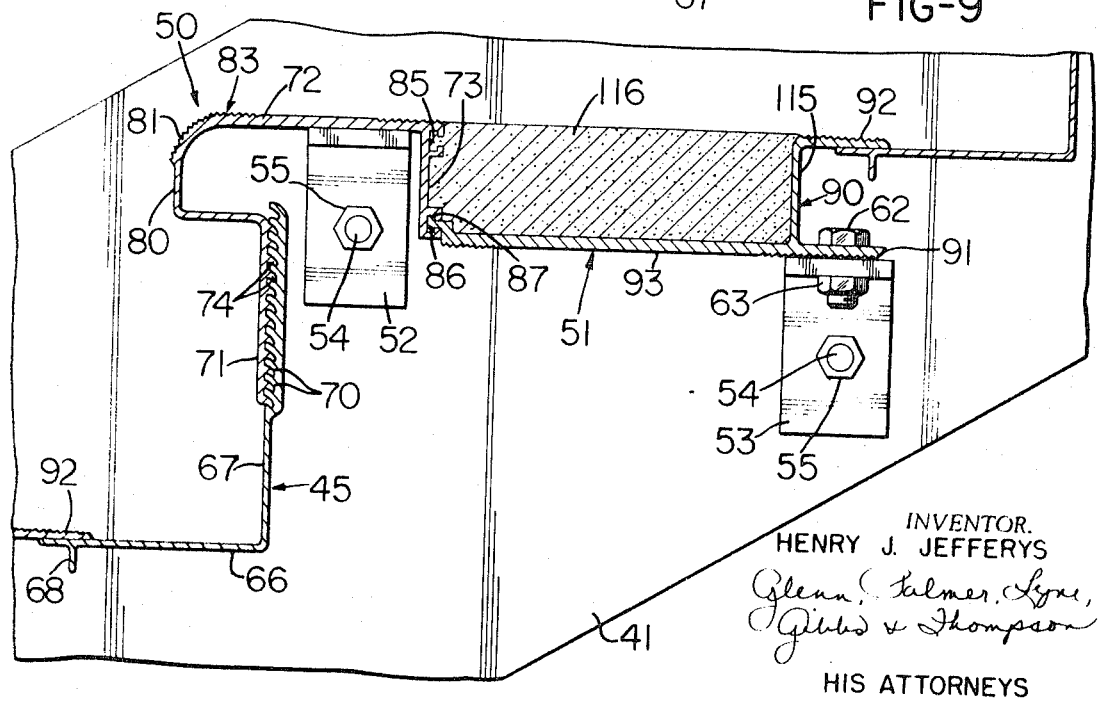

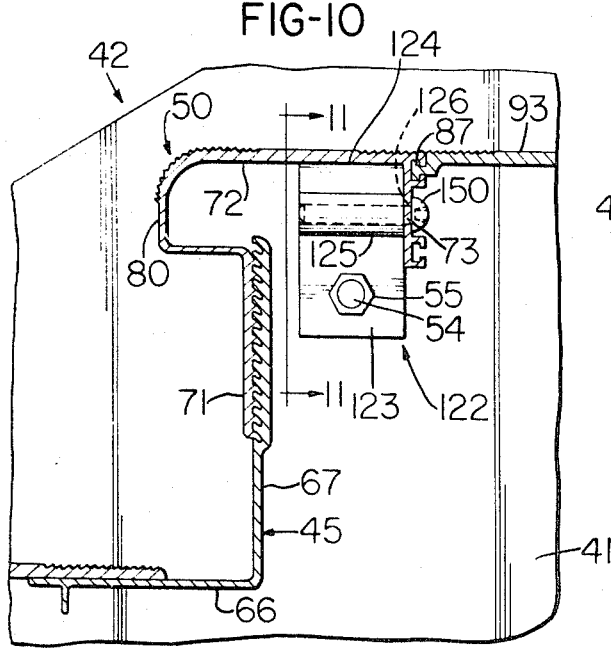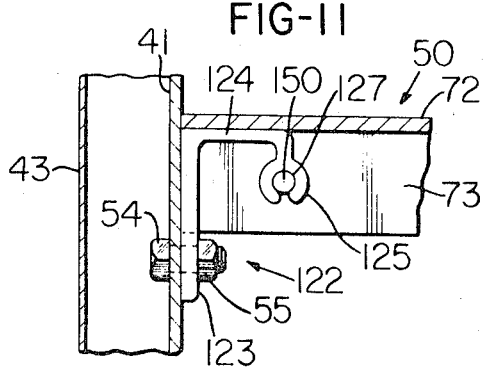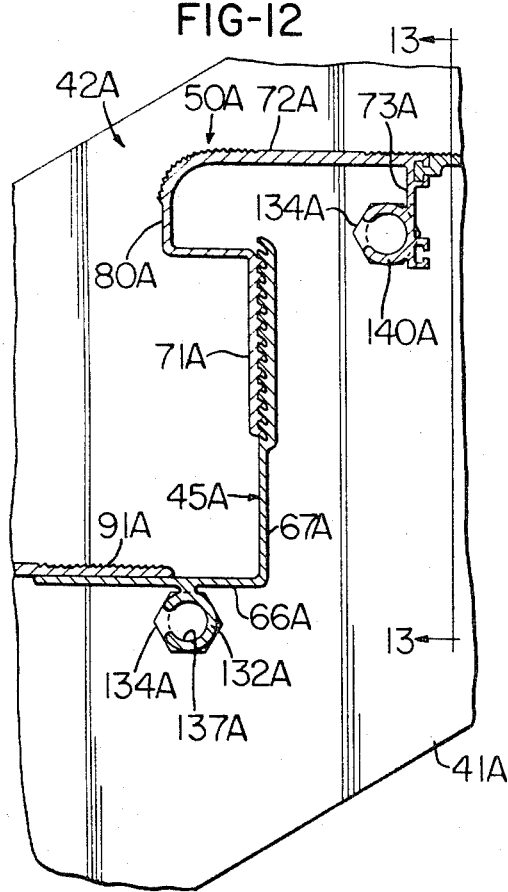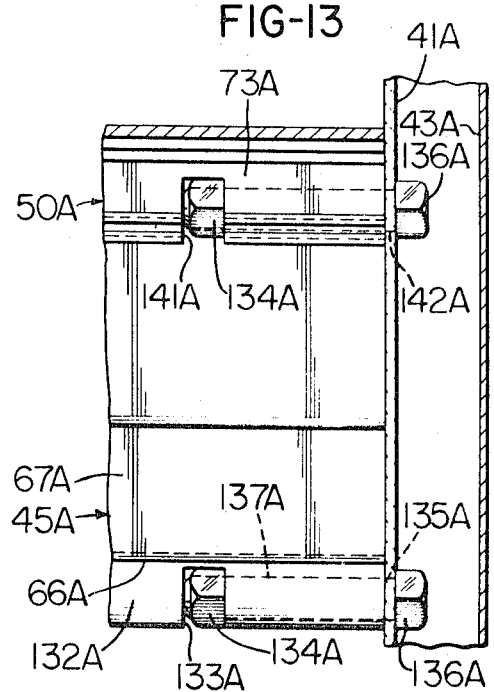

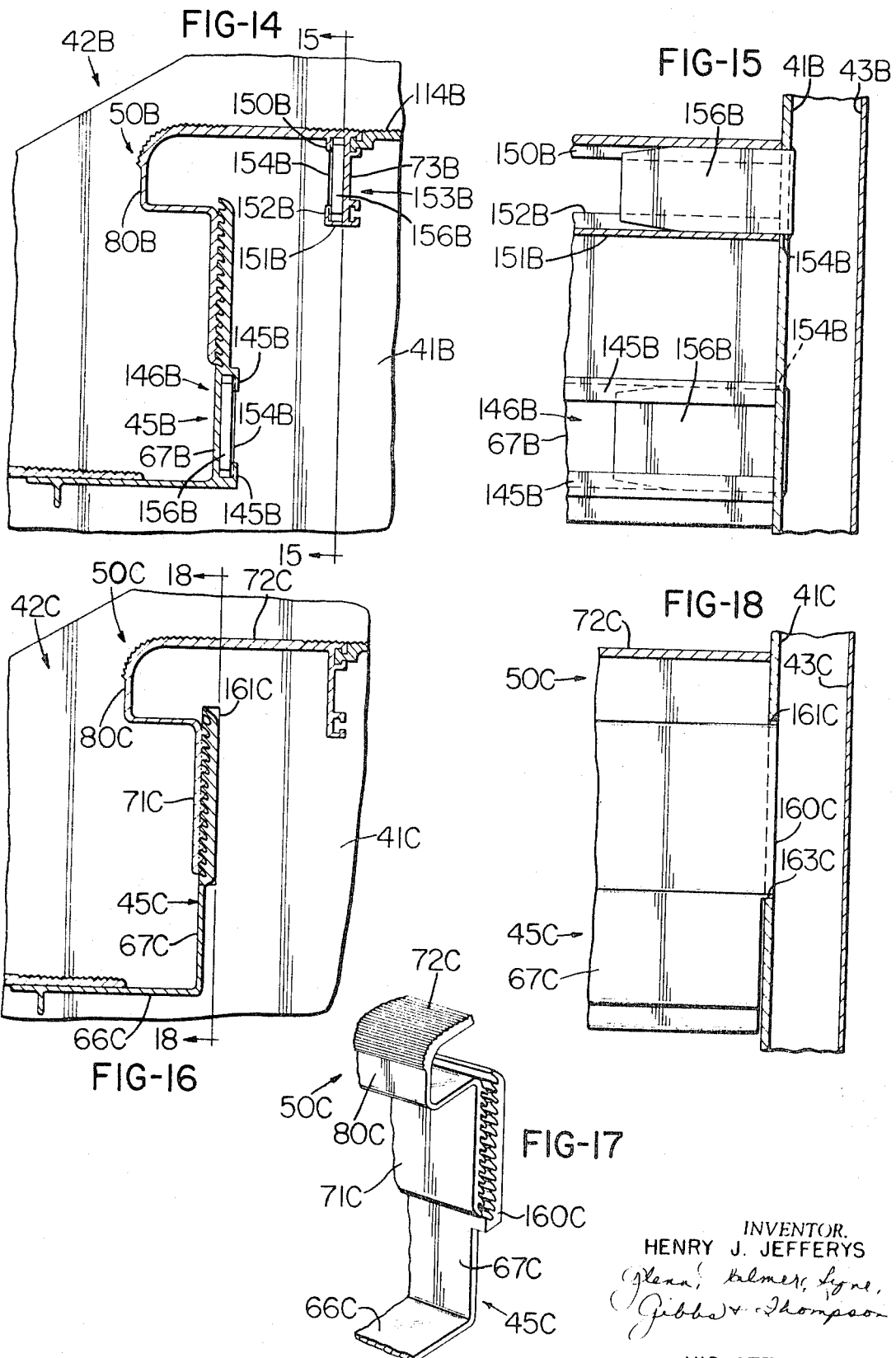

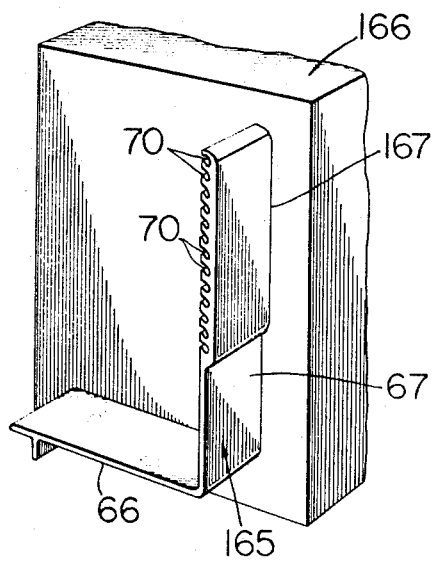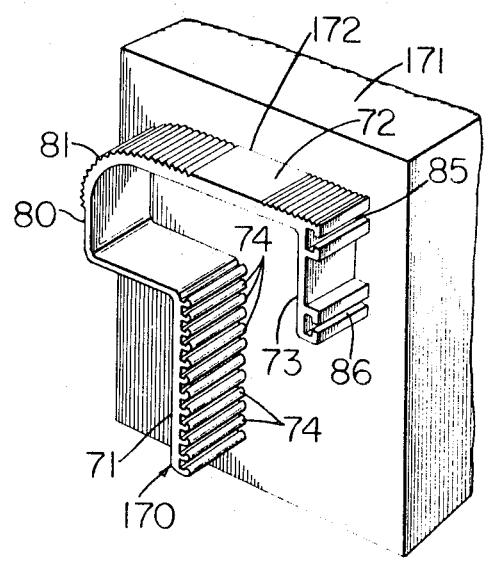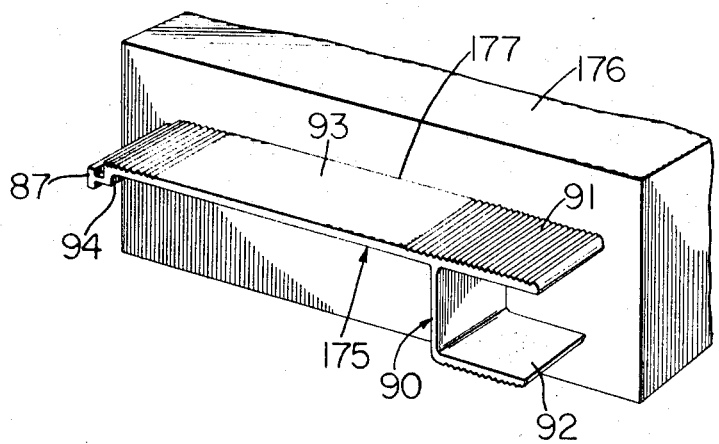

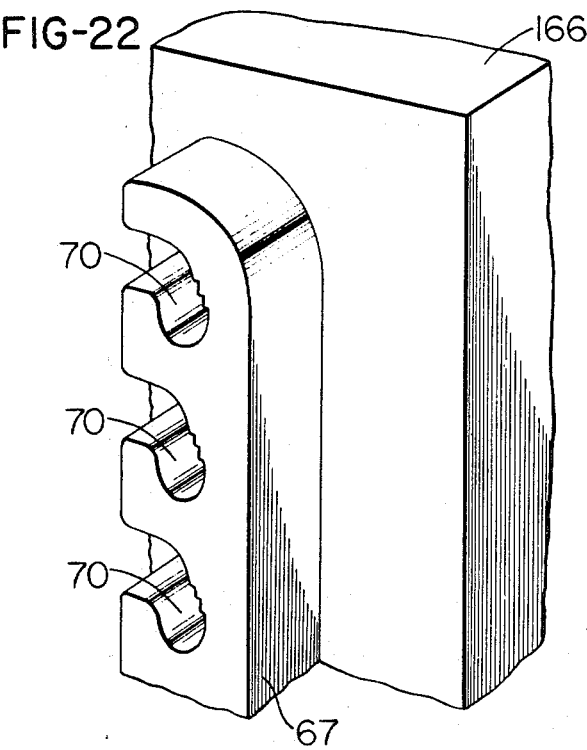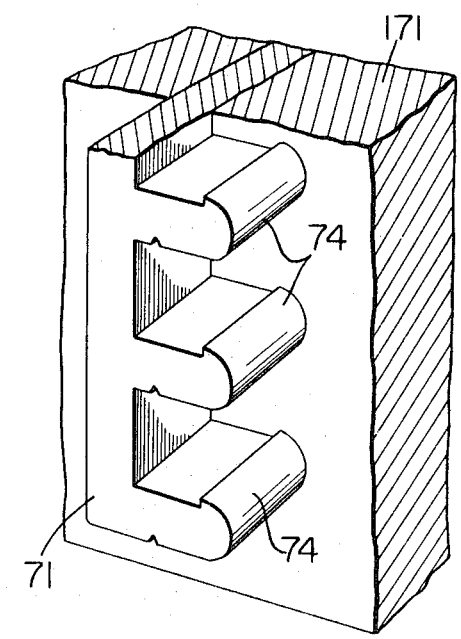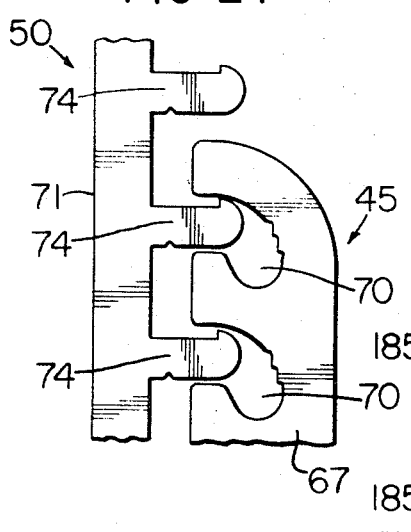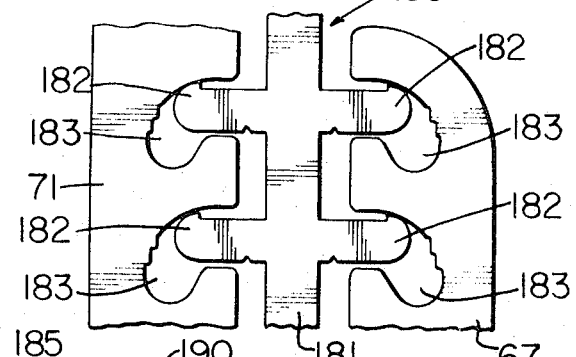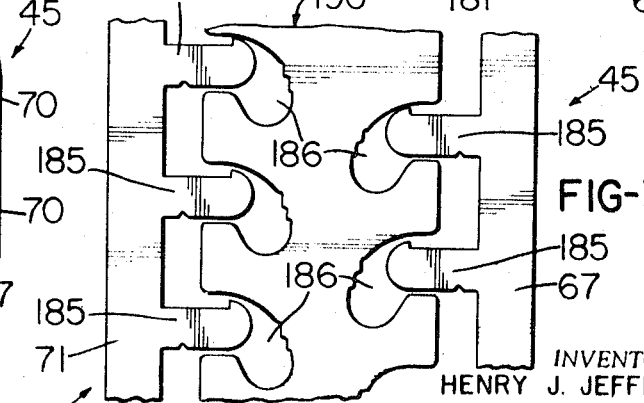

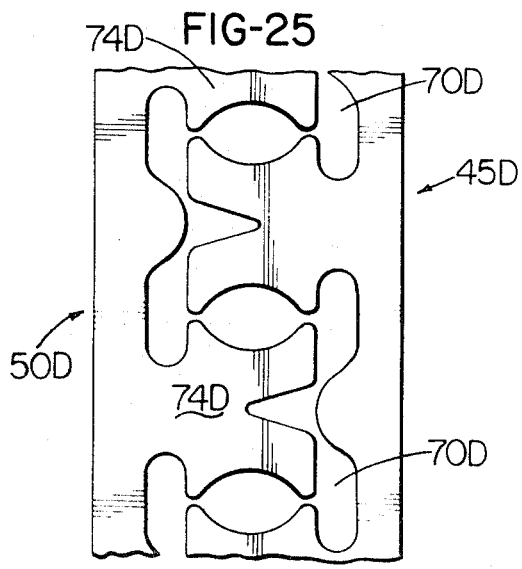
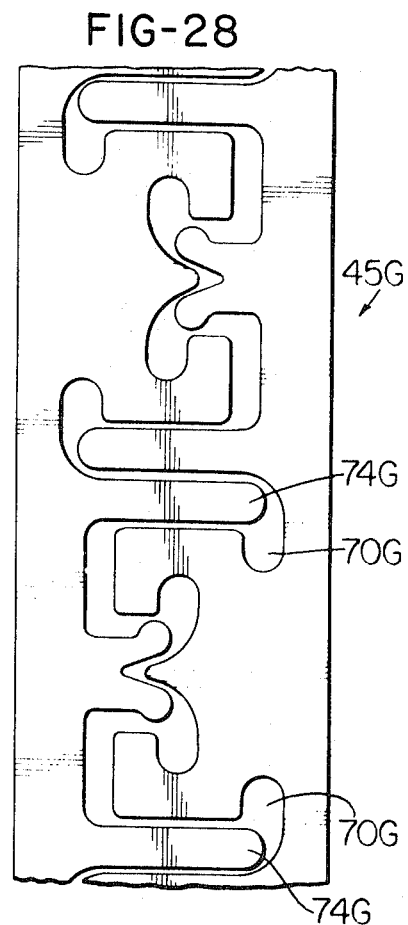
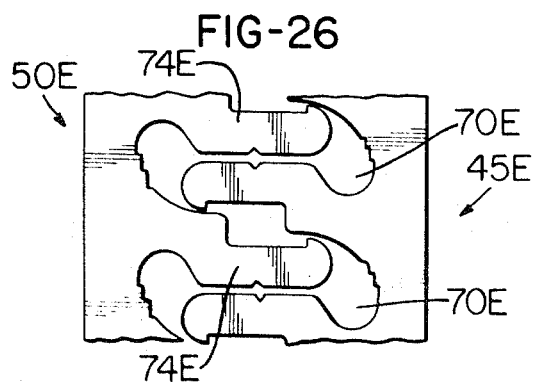
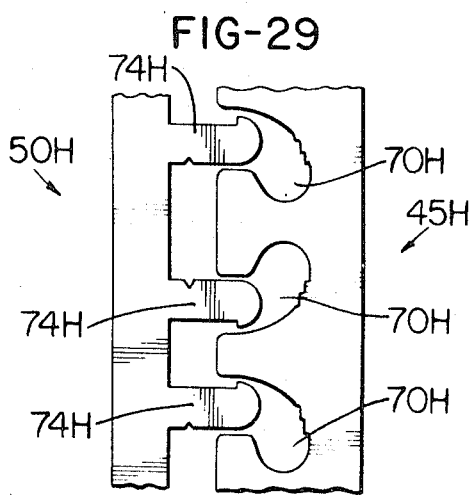
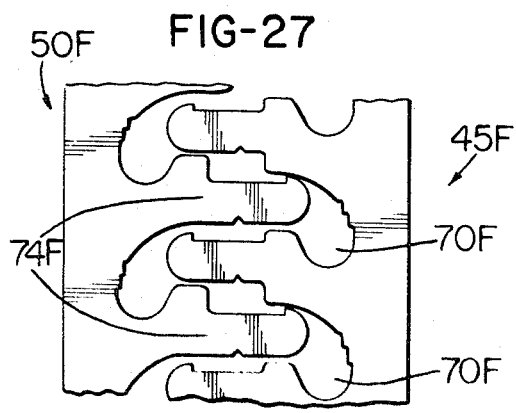

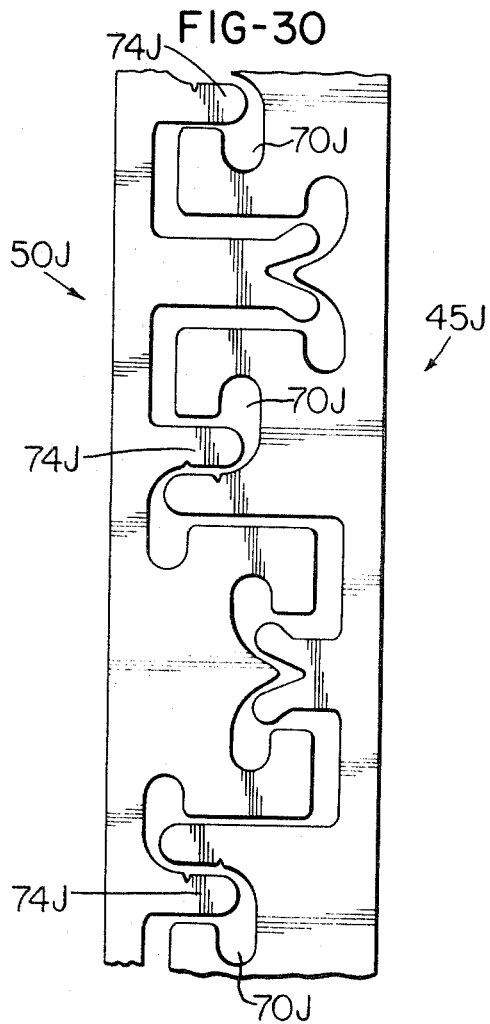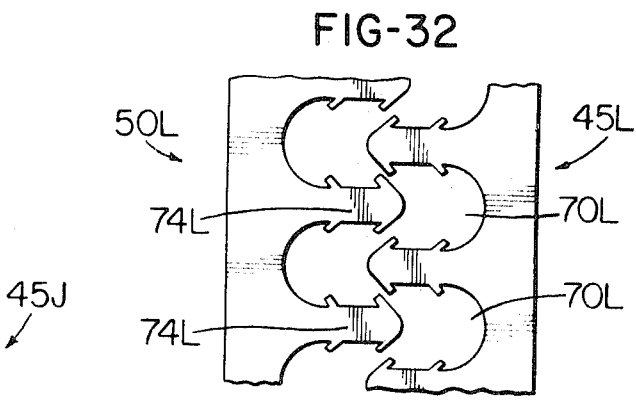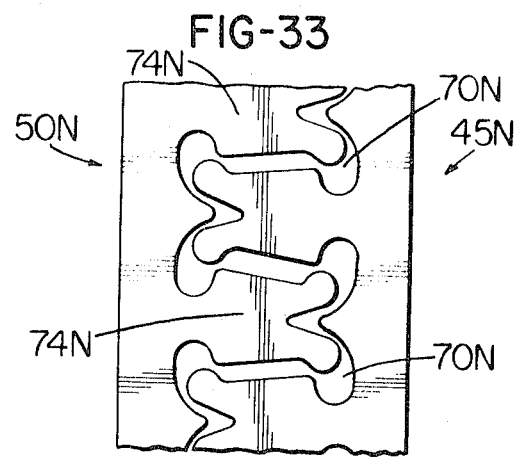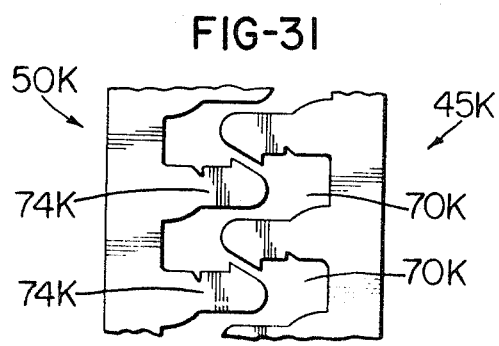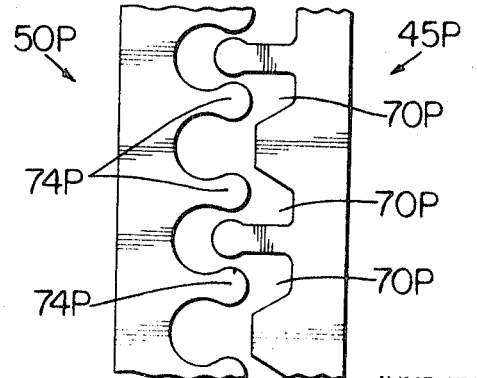

United States Patent Office

3,608,256
Patented Sept. 28, 1971

3,608,256
STEP CONSTRUCTION
Henry J. Jefferys, Manakin Sabot, Va., assignor to
Reynolds Metals Company, Richmond, Va.
Original application Dec. 1, 1967, Ser. No. 687,174, now Patent No. 3,499,254, dated Mar. 10, 1970. Divided and this application Oct. 15, 1969, Ser. No. 870,871
Int. Cl. E04f 11/00
U.S. Cl. 52—182   22 Claims

ABSTRACT OF THE DISCLOSURE

This disclosure relates to a step assembly having a riser which is adjustable and a tread comprised of a tread nosing and a reversible tread pan which defines a horizontal surface in one of its positions and provides an integral pan-like mold for receiving a step-forming material in its reversed position.

This application is a divisional patent application of its co-pending parent application, Ser. No. 687,174, filed Dec. 1, 1967, now Pat. No. 3,499,254, and is assigned to the same assignee to whom the parent application is assigned.

BACKGROUND OF THE INVENTION

In providing a plurality of step assemblies or steps in a stairway construction it is desirable to fabricate such stairway inexpensively, having high strength, and utilizing standardized component parts which may be fastened together in such a manner that the vertical height of the riser of each step assembly as well as the tread width may be varied to suit the particular application. In addition, it is highly desirable that the standardized component parts be constructed to enable them to be used in aplications where it is preferred that the tread be comprised of a material such as terrazzo, or the like, yet without requiring additional special forms and expensive component parts to enable proper installation of the terrazzo.

SUMMARY

This invention provides an improved step assembly comprised of a riser which is adjustable in height and a tread which is adjustable in width and is capable of being reversed so that in one of its positions it defines a substantially horizontal walking surface and in its reversed position it defines an integral pan-like mold for receiving a step-forming material.

Other details, uses, and advantages of this invention will become apparent as the following description of the embodiments thereof presented in the accompanying drawings proceeds.

BRIEF DESCRIPTION OF THE DRAWINGS

The accompanying drawings show present preferred embodiments of this invention, in which FIG. 1 is a perspective view with a portion thereof broken away illustrating a stairway which utilizes a plurality of improved step assemblies of this invention;

FIG. 2 is a sectional view with parts broken away taken on the line 2—2 of FIG. 1 and particularly illustrating a riser and a tread nosing of a step assembly suitably fastened together to provide a minimum riser height;

FIG. 3 is a fragmentary sectional view similar to FIG. 2 and particularly illustrating the riser and tread nosing comprising the step assembly of FIG. 2 fully extended to illustrate a greater step height which may be provided by reducing the number of cooperating projections and grooves provided in the riser and tread nosing which are suitably intermeshed to fasten such riser and tread nosing together;

FIG. 4 is a view with parts in section and parts broken away taken on the line 4—4 of FIG. 2 and illustrating one embodiment of a single piece cover provided in association with each stringer comprising the stairway of FIG. 1;

FIG. 5 is a fragmentary view with parts in section and parts broken away particularly illustrating another embodiment of a stringer and two-piece cover therefor which may be used in lieu of each stringer illutrated in FIG. 4 of the drawings;

FIG. 6 is an enlarged fragmentary end view illustrating a plurality of grooves provided in the vertical leg of the riser of FIG. 2 and cooperating projections provided in the vertical leg of the tread nosing of FIG. 2 prior to interlocking such vertical legs together;

FIG. 7 is an end view similar to FIG. 6 illustrating the projections provided in the vertical leg portion of the tread nosing mechanically deformed within associated grooves in the vertical leg portion of the riser;

FIG. 8 is a fragmentary view taken on the line 8—8 of FIG. 7 particularly illustrating a plurality of rectangular cutouts provided in the vertical leg of the riser to prevent stress concentrations;

FIG. 9 is a view similar to FIG. 2 illustrating the reversible pan comprising the tread of the step assembly in its reversed position so as to define a pan-like mold for receiving a step forming material such as terrazzo, or the like;

FIG. 10 is a view similar to FIG. 2 with parts broken away and illustrating another embodiment of a pair of supports used to support the forward end of a step assembly to an associated stringer;

FIG. 11 is a view on the line 11—11 of FIG. 10;

FIG. 12 is a view similar to FIG. 2 and particularly illustrating a pair of integral substantially C-shaped ribs each extending the full length of the riser and tread nosing respectively and each being utilized in association with fastening bolts to fasten the riser and tread nosing at its opposite ends to associated stringers;

FIG. 13 is a view on the line 13—13 of FIG. 12 particularly illustrating a typical cutout adjacent one end of each C-shaped rib which is adapted to receive a fastening nut therewithin;

FIG. 14 is a view similar to FIG. 2 illustrating another embodiment of a pair of substantially C-shaped ribs each extending the full length of a riser and tread nosing respectively and each being adapted to have each end thereof supported by an associated supporting wedge which is inserted through a cooperating opening provided in an associated stringer;

FIG. 15 is a fragmentary view on the line 15—15 of FIG. 14 with parts in section and parts broken away particularly illustrating the manner of fastening one end of the riser and tread nosing to an associated stringer using fastening wedges;

FIG. 16 is a view similar to FIG. 2 illustrating another embodiment of this invention in which each end of each step assembly is welded in position to an associated stringer;

FIG. 17 is a fragmentary perspective view particularly illustrating the vertical leg of the riser and an associated vertical leg of a tread nosing fastened together and illustrating the arrangement of a projection extending outwardly from one end of the riser which is adapted to be inserted through an associated slot in a stringer for welding;

FIG. 18 is a fragmentary view on the line 18—18 of FIG. 16 particularly illustrating the slot in a stringer which is adapted to receive an associated projection extending from the vertical leg of a riser;

FIG. 19 is a fragmentary perspective view illustrating an elongated member being extruded through an associated die and having the identical cross-sectional configuration of a riser so that each riser of a step assembly may be made therefrom merely by cutting the extruded member to the desired length;

FIG. 20 is a fragmentary perspective view similar to FIG. 19 and illustrating an elongated member being extruded through an associated die to define a member having the identical cross-sectional configuration of a tread nosing so that each tread nosing may be made therefrom by cutting to the desired length;

FIG. 21 is a fragmentary perspective view similar to FIG. 19 illustrating an elongated member being extruded through an associated die wherein such member may be cut to length to define the reversible tread pan of FIG. 2;

FIG. 22 is an enlarged fragmentary perspective view particularly illustrating a portion of the die of FIG. 19 and associated integral grooves comprising a part of the riser being extruded therethrough;

FIG. 23 is an enlarged fragmentary perspective view of a portion of the die of FIG. 20 particularly illustrating cooperating projections comprising a part of the tread nosing and which are to be inserted and mechanically deformed within cooperating grooves of an associated riser;

FIG. 24 is an enlarged fragmentary end view particularly illustrating the manner of placing the projections of the tread nosing formed as shown in FIG. 23 within cooperating grooves of the riser formed as shown in FIG. 22 prior to mechanical deformation thereof to fasten the two members together;

FIGS. 25 through 34 illustrate various embodiments of projections and grooves which may be provided in association with either the vertical leg of a stringer or a tread nosing showing each set of such projections and grooves arranged together prior to mechanical interlocking thereof;

FIG. 35 is a fragmentary view particularly illustrating one embodiment of an intermediate member used to interlock a riser and tread nosing together; and FIG. 36 is a view similar to 35 and illustrates another embodiment of an intermediate member used to interlock a riser and tread nosing together.

DESCRIPTION OF ILLUSTRATED EMBODIMENT

In the exemplary embodiment of this invention illustrated in FIG. 1 of the drawings an improved stairway or step construction 40 is illustrated having a pair of identical spaced apart stringers 41 and a plurality of step assemblies each designated generally by the numeral 42 and only a representative few of such step assemblies being so designated. Each stringer 41 of the stairway 40 has a cover 43 provided along its outer exposed surface so as to provide a construction having a pleasing external appearance.

As seen particularly in FIG. 2 of the drawings each step assembly is comprised of a substantially L-shaped riser 45 and a tread indicated generally by the numeral 46 which has a substantially horizontal surface in one of its positions illustrated in FIG. 2 and has a portion which is reversible to define an integral pan-like mold for receiving a step-forming material, such as terrazzo, or the like, essentially as illustrated in FIG. 9 of the drawings.

Each tread 46 is comprised of a tread nosing 50 which is fastened to the riser 45 and a reversible tread pan 51 fastened to the tread nosing and defining the central part of the horizontal surface of tread 46. The pan 51 is adapted to be reversed to define parts of a pan-like mold as will be described in detail subsequently.

In the exemplary embodiment of this invention illustrated in FIGS. 1 through 4 a suitable support is utilized for supporting each end of each step assembly 42 to an associated stringer 41. In particular, it will be seen that two L-shaped supports 52 and 53 are utilized at each end. Each L-shaped support 52 and 53 is fastened to an associated stringer 41 by a bolt 54 which extends through cooperating aligned openings provided in the particular L-shaped support and associated stringer 41 and a nut 55 used in association with each bolt 54.

Each L-shaped support 52 is arranged in supporting relation beneath the tread nosing 50 as shown at 57 and allows sliding horizontal movement of the tread nosing 50 along the horizontal leg portion 60 of L-shaped support 52. Similarly, each L-shaped support 53 has a horizontal leg portion 61 which supports the inner end portion of pan 51 and in this example of the invention a bolt 62 and a cooperating nut 63 is used to attach pan 51 to horizontal leg portion 61.

Each end of each step assembly 42 illustrated in the exemplary embodiment of this invention of FIGS. 1–4 of the drawings is effectively fitted to an associated stringer at only one position so that with the tread nosing 50 and pan 51 fastened together and the riser fastened to the vertical leg of the tread nosing each step assembly 42 is capable of moving horizontally relative to stringers 41 to effectively eliminate any tendency for stress buildup.

As seen particularly in FIG. 2 of the drawings the L-shaped riser 45 of each step assembly 42 has a horizontal leg 66 and a vertical leg 67 and the vertical leg 67 has a plurality of spaced apart grooves 70 extending therein from one vertical surface and arranged therealong in substantially parallel spaced apart relation. An integral strengthening rib 68 is also provided in the horizontal leg 66 of riser 45.

The tread nosing 50 has a substantially vertical leg 71 and a horizontal leg 72 which terminates in a fastening flange 73 provided in its terminal inner end and the vertical leg 71 has a plurality of substantially parallel spaced apart projections 74. The riser 45 and tread nosing 50 are fastened together by inserting a plurality of projections 74 within a corresponding number of grooves 70 provided in leg portion 67 of riser 45 essentially as illustrated in enlarged detail in FIG. 24 and the projections 74 are then mechanically deformed within cooperating projections 70 to define a construction as illustrated in FIGS. 2 and 7.

The above described fastening technique provides a high strength construction which has optimum structural strength. Furthermore, because of the plurality of parallel spaced apart projections 74 provided in vertical leg 71 of tread nosing 50 and cooperating grooves 70 provided in vertical leg portion 67 of riser 45 it is readily possible to intermesh any desired number of projections and grooves prior to mechanical deformation and thereby adjust the height between the horizontal tread 46 of a pair of adjacent steps so that practically any desired height may be provided.

In particular, FIG. 2 illustrates the manner in which substantially all of the cooperating projections 74 and grooves 70 are interlocked together to provide the minimum height as shown as 75 between a pair of adjacent horizontal treads 46 while in FIG. 3 the riser 45 has been fastened in position to the tread nosing 50 so as to provide a maximum height between adjacent horizontal treads 46 as illustrated at 76.

Although the number of projections 74 which are intermeshed and suitably deformed together to provide the adjustable height between a pair of adjacent horizontal treads 46 may vary depending upon the particular configuration of the cooperating projections and grooves, for the particular configuration illustrated in FIG. 2 of the drawings it is preferred that a minimum number of four projections 74 be inserted and suitably mechanically deformed within four associated cooperating grooves 70 to provide a construction having the desired structural strength. Also, it will be appreciated that in many applications it may be desirable to provide only one projection 74 in tread nosing 50 and an associated groove 70 in riser 45.

Any suitable technique may be utilized for mechanically deforming the projections 74 within associated grooves 70. One technique that has been used successfully is the use of a mechanical press which provides such deformation in a controlled manner.

The substantially L-shaped tread nosing 50 has a vertical leg 71 and a horizontal leg 72 as previously mentioned. The vertical leg 71 has an outwardly offset portion 80 defining its upper end and which is provided with an arcuate transition surface 81 between the upper end of vertical leg 71 and the horizontal leg 72. The tread nosing 50 also has a plurality of integral substantially parallel spaced apart ridges indicated at 83 which define a substantially non-skid walking surface.

The supporting flange 73 comprising tread nosing 50 extends substantially vertically downwardly below the inner end of the horizontal leg portion 72 and is arranged in substantially parallel spaced apart relation with the vertical leg portion 71. The supporting flange 73 is used to supported the front part of tread pan 51.

The fastening flange 73 has a pair of identical slots provided therein shown as an upper slot 85 and a lower slot 86. Each slot 85 and 86 is adapted to receive a cooperating T-shaped fastening connector or tongue 87 provided on tread pan 51. Although each slot 85 and 86 may have any desired configuration, in this example of the invention each slot 85 and 86 has a substantially T-shaped cross-sectional configuration.

The pan 51 may be installed so that its T-shaped fastening connector 87 is inserted within either the upper slot 85 as shown in FIG. 2 or the lower slot 86 as shown in FIG. 9 to thereby fasten tread nosing 50 to tread pan 51. The construction of each T-shaped slot 85 and 86 is such that it is adapted to be deformed inwardly against T-shaped tongue 87 so as to provide a rattle-free construction.

The pan 51 of each step assembly 42 is defined by a substantially U-shaped portion indicated at 90 having a pair of parallel arms designated by the numerals 91 and 92 respectively and an integral extension 93 extending in the opposite direction from one of its parallel arms illustrated as arm 91 in this exemplary embodiment of the invention. Integral extension 93 has a cooperating fastening flange 94 which has the previously mentioned T-shaped tongue 87 extending outwardly therefrom. Each T-shaped slot 85 and 86 may be mechanically deformed around an associated T-shaped tongue 87 either along its full length or at one or more points along its length to thereby provide a construction which is substantially rattle free.

In the exemplary embodiment of this invention illustrated in FIG. 2 of the drawings it will be seen that the parallel arm 92 of U-shaped portion 90 is supported on horizontal portion 61 of L-shaped support 53 and suitably bolted thereto utilizing bolt 62 and an associated nut 63.

As seen particularly in FIG. 4 of the drawings, each stringer 41 has the previously mentioned single piece cover 43 fastened adjacent the terminal outer edges of parallel legs 97 of each stringer 41. Each parallel leg 97 has a pair of ridges each designated by the numeral 100 extending therealong which are utilized to hold single piece cover 43 in position.

Each single piece cover 43 is also substantially U-shaped and has a pair of substantially parallel legs 101 and each leg 101 has a pair of channels 102 provided therein. The cover 43 is snap-fitted into position by pushing its parallel legs 101 within the parallel legs 97 of an associated stringer 41 so that each channel 102 is snapped around an associated ridge 100. The resulting construction is such that a substantially smooth exterior surface is defined by the outside surface of single piece cover 43 and the terminal edge portion of each leg 97 of an associated stringer 41.

Another exemplary embodiment of a stringer is illustrated in FIG. 5 of the drawings wherein the particular stringer is designated by the numeral 41M and has a pair of parallel legs 97M each having a single groove extending therealong designated by the numeral 103M. The U-shaped stringer 41M also has a central rib 104M extending therealong and projecting in the same direction from its bight or base leg as the parallel legs 97M. A cover is provided for the exposed surface of each stringer 41M in the form of a two-piece cover wherein each piece is designated by the numeral 105 and is substantially L-shaped in configuration.

The central rib 104M comprising stringer 41M has a pair of contoured surfaces 106M extending along its opposite side edges and adapted to receive a cooperating contoured terminal end 107 of one leg portion 108 of each L-shaped cover 105. Each L-shaped cover 105 is also snap-fitted into position by inserting an offset end portion 111 provided in its other leg 112 within a groove 103M provided in an associated parallel leg 97M of stringer 41M, whereby each stringer 41M also has an exposed exterior surface which is substantially smooth and has a pleasing appearance.

As previously described in connection with the tread nosing 50, the pan 51 also has a plurality of parallel spaced apart ridges provided on its outside surface and designated by the numeral 114 at a pair of spaced apart locations. The spaced apart ridges in this example of the invention extend across the full length of each pan 51, are formed as an integral part thereof, and define a non-skid walking surface.

As previously mentioned, the pan 51 is reversible and in its reverse position defines an integral pan-like mold for receiving a step-forming material. The pan-like mold is formed by reversing the pan 51 from the position illustrated in FIG. 2 to the position illustrated in FIG. 9 upon inserting the locking T-shaped tongue 87 of pan 51 in the lower T-shaped slot 86 provided on the tread nosing 50. With this arrangement it will be seen that the bottom wall of the pan-like mold is defined by extension 93 of pan 51 and a pair of oppositely arranged side walls extend upwardly from such bottom wall and are defined by supporting flange 73 along one side and the bight 115 of U-shaped portion 90 comprising pan 51 along the other side.

With this arrangement it is a simple matter to build a pan-like mold for receiving a step-forming material such as terrazzo, or the like, and provide a step construction in which the high structural strength components utilized to form the step assembly 42 shown in FIG. 2 may be utilized to form the assembly illustrated in FIG. 9 yet without requiring special forms and special installation procedures to install and finish the terrazzo-like material which is indicated by the numeral 116. The unique arrangement of the tread nosing 50 and tread pan 51 is also such that the terrazzo-like material 116 is provided in the central portion of a given step assembly thereby enabling easy access for finishing of the exposed surface thereof with minimum interference by adjoining components.

As previously explained the vertical leg portion 67 of riser 45 is fastened to the vertical leg 71 of tread nosing 50 by mechanically deforming a plurality of projections 74 of leg 71 within associated slots 70 provided in vertical leg 67. The projections 74 and slots 70 are arranged in parallel spaced apart relation and during the process of mechanically intermeshing each projection 74 within an associated slot 70 there is a tendency for the metal to shear adjacent the area of bending or deforming each projection 74 within its associated slot 70. In addition, during repeated loading through continued use there is a greater tendency to create a horizontal shear condition between the intermeshed members.

To preclude the possibility of weakening the structural integrity of the connection between the riser 45 and tread nosing 50 a plurality of cutouts each designated by the same numeral 120 are provided in spaced apart relation in the vertical leg 67 of riser 45 across the length thereof and in association with at least one of the grooves 70 provided therein and such cutouts help reduce or prevent horizontal shear, see FIG. 8. The cutouts 120 may be arranged in an aligned rectilinear path across the length of the riser 45. However, they may be provided in any desired pattern. With the provision of cutouts 120 it will be appreciated that portions of a projection 74 extending from tread nosing 50 extend through cutouts 120 of vertical leg 67 of riser 45 in an unobstructed manner and thereby potential continuous horizontal shear areas or lines are not set up in either the tread nosing 50 or the riser 45 upon deforming the remaining portions of the particular intermeshed projection 74 in position.

The step assembly illustrated in FIG. 2 of the drawings is supported in position on a pair of substantially L-shaped supporting flanges designated by the numerals 52 and 53. A modification of the manner of supporting step assembly 42 in position is illustrated in FIGS. 10 and 11 of the drawings wherein the L-shaped support 52 is replaced with a support designated by the numeral 122 which is also substantially L-shaped and has a vertical leg portion 123 and a horizontal leg portion 124 which terminates in a substantially C-shaped supporting flange 125.

The support 122 is fastened to an associated stringer 41 utilizing a bolt 54 and an associated nut 55. The tread nosing 50 has an opening 126 formed therein which extends through its supporting flange 73 and the step assembly 42 is installed in position so that the opening 126 is aligned with an opening 127 provided in the C-shaped fastening flange or screw boss 125. A fastening member such as a fastening screw or pin 150 may be easily inserted through aligned openings 126 and 127 to thereby attach the tread nosing and hence the forward portion of a step assembly 42 to an associated stringer 41 at each end of the step assembly. The rear portion of the step assembly 42 which has its forward end portion fastened as illustrated in FIG. 10 of the drawings is fastened in position utilizing L-shaped fastening flange 53 and in a manner as previously described in this specification.

Another exemplary embodiment of the step assembly 42 of this invention is illustrated in FIGS. 12 and 13 of the drawings. The step assembly illustrated in FIGS. 12 and 13 is very similar to the step assembly 42; therefore, such step assembly will be designated generally by the numeral 42A and parts of step assembly 42A and associated structures which are similar to corresponding parts of step assembly 42 will be designated by the same numeral as step assembly 42 also followed by the letter designation A and not described again. Only those parts which are different from corresponding parts of step assembly 42 will be designated by a new numeral also followed by the letter designation A and described in detail.

The main difference between the step assembly 42A and 42 is that integral means is provided in the tread nosing 50A and riser 45A to enable fastening the forward portion of step assembly 42A in position. Thus, it is seen that the riser 45A has a substantially C-shaped rib 132A extending substantially the full length thereof and arranged in substantially parallel relation to the horizontal leg 66A and vertical leg 67A thereof. The C-shaped rib 132A is provided with a cutout 133A spaced inwardly from an end thereof and each cutout 133A is adapted to receive a threaded fastening nut 134A.

It is a simple matter to provide an aligned hole or opening 135A in an associated stringer 41A and fasten one end of the riser 45A in position simply by inserting an elongated threaded bolt 136A through an associated opening 135A and through an opening 137A provided in C-shaped fastening flange 132A and then threading through the nut 134A which is loosely held in cutout 133A to enable tread engagement. This technique enables the tightening of bolt 136A after initial tread engagement with nut 134A because nut 134A may be hexagonal or of similar configuration and dimensioned so that one of its flattened sides is positioned adjacent the lower surface of the lower horizontal leg 66A of riser 45A to prevent turning during tightening, whereby the installation of the step assembly 42A is very efficiently provided.

The tread nosing 50A comprising step assembly 42A also has a substantially C-shaped rib 140A provided as an integral part of its flange 43A and extending inwardly therefrom. The C-shaped rib 140A also has a cutout 141A provided therein. The stringer 41A is provided with a cooperating opening 142A which is similar to opening 135A and is adapted to enable the installation of a fastening bolt therethrough for fastening the tread nosing 50A and specifically the C-shaped rib 140A comprising such tread nosing in position. An identical fastening nut 134A and bolt 136A is utilized in association with C-shaped rib 140A for fastening each end of tread nosing 50A in position upon holding the nut 134A in position within the cutout 141A and threading the bolt 136A in position to provide a firm attachment essentially as described in connection with C-shaped rib 132A.

The technique described for fastening step assembly 42A in position provides a high strength construction; also, upon inserting a bolt 136A through an associated opening in the stringer 41A and through the opening provided in an associated C-shaped rib a firm and adequate support is provided even if the fastening bolt were to subsequently work loose from its associated nut 134A.

Another exemplary embodiment of the step assembly 42 of this invention is illustrated in FIGS. 14 and 15 of the drawings. The step assembly of FIGS. 14 and 15 is similar to the step assembly 42; therefore, such step assembly and associated structures will be designated generally by the numeral 42B and component parts thereof which are similar to corresponding parts of step assembly 42 will be designated by the same numeral as in step assembly 42 also followed by the letter designated B and not described again. Only those component parts which are different from corresponding parts of step assembly 42 will be designated by a new numeral also followed by the letter designation B and described in detail.

The step assembly 42B has simple supports for supporting riser 45B and the tread nosing 50B thereof in position. In particular, it will be seen that the lower portion of the vertical leg 67B of riser 45B has a pair of substantially L-shaped supporting flanges each designated by the same numeral 145B. The L-shaped supporting flanges 145B extend so that their vertical leg portions are arranged substantially parallel to the lower portion of vertical leg 67B and cooperate with leg 67B to define a substantially C-shaped rib which is designated generally by the numeral 146B and which is adapted to receive a fastening member in a manner as will be subsequently described.

Similarly, the tread nosing 50B is provided with a pair of integral flanges comprised of a straight flange 150B and a substantially L-shaped flange 151B. The flange 150B extends parallel to and in spaced apart relation from supporting flange 73B. The flange 151B has a vertical leg portion designated by the numeral 152B which is aligned with flange 150B and as will be apparent from FIG. 14 of the drawings the flanges 150B, 152B, and 73B cooperate to define a substantially C-shaped supporting rib 153B which is utilized to fasten the tread nosing 50B in position upon receiving an associated fastening member therewithin.

The manner of fastening the sub-assembly 42B in position is highlighted as shown in FIG. 15 of the drawings wherein an associated stringer 41B has a pair of elongated slots 154B provided therein and each having a substantially rectangular outline. Each slot 154B is arranged so as to be aligned with associated C-shaped ribs 146B and 153B. A fastening member shown in this example as a tapered fastening wedge 156B is provided for insertion through an associated rectangular slot 154B and through an associated C-shaped rib at 143B or 153B to thereby firmly attach and hold the forward end of the step assembly 42B in position in a simple manner. In some applications of this invention it may be desired to weld the wedge 156B to stringer 41B.

Another exemplary embodiment of this invention is illustrated in FIGS. 16–18 of the drawings. The step assembly of FIGS. 16–18 is similar to the step assembly 42; therefore, as described previously in connection with the step assemblies 42A and 42B the step assembly of FIGS. 16–18 will be designated generally by the numeral 42C and parts thereof and associated structures which are very similar to corresponding parts of step assembly 42 will be designated by the same numeral as step assembly 42 also followed by the letter designation C and not described again. In connection with this embodiment it should be noted that the cross-sectional configurations of members 45C and 50C are identical to members 45 and 50 respectively.

The vertical leg portion 67C of riser 45C is suitably fastened to vertical leg 71C of tread nosing 50C which has the correct length and in a manner as previously described in connection with step assembly 42. A portion is then cut away from each end of leg portion 67C of riser 45C to thereby define a projection 160C extending from each end thereof and the resulting assembly of riser 45C and tread nosing 50C comprises the step assembly 42C. Each projection 160C is inserted in position through an associated opening 161C and as seen in FIG. 18 of the drawings a lower edge 163C of projection 160C rests upon stringer 41C at the lower edge of its associated slot 161C. Each projection 160C and hence each end of step assembly 42C may then be fastened in position by welding to an associated stringer 41C.

Having described the various embodiments of the improved step assembly of this invention and the manner of supporting the risers, trend nosing, and tread pan in position in such various embodiments a detailed presentation will now be made of the preferred technique for forming the major component parts comprising each particular step assembly of this invention.

The riser 45 is preferably formed from an elongated extruded member 165 which is extruded through an associated die 166 as illustrated in FIG. 19 of the drawings. The die 166 has an extrusion opening 167 provided therein so as to provide the desired configuration in the elongated member 165 from which riser 45 is made. Each elongated extruded member 165 has the cross-sectional configuration of riser 45 and it will be appreciated that each riser 45 is formed merely by cutting a desired length from member 165. The component parts of member 165 have been given the same reference numerals as corresponding parts in riser 45 for easy reference thereto and will not be described again.

The risers 45A and 45B previously described in this specification are each also formed by extruding an associated elongated member through an associated die similar to die 166 which has its extrusion opening suitably modified to provide the identical cross-sectional configuration of either riser 45A or 45B and the particular elongated member is then cut to length to form the particular riser.

The tread nosing 50 comprising the step assembly 42 is also preferably formed by extruding an elongated member 170 through an associated die 171 as seen in FIG. 20. Die 171 has an extrusion opening 172 provided therein so as to provide the desired configuration in member 170 from which the tread nosing 50 is made. The tread nosing 50 is formed by cutting the elongated extruded member 170 to the desired length. Also, it will be seen that the component parts of member 170 have been given the same reference numerals as corresponding parts of member 50 for easy reference thereto and will not be described again.

In a similar manner as described in connection with the embodiments 45A and 45B of riser 45, the manner of forming the embodiments 50A or 50B of the tread nosing 50 is not illustrated in the drawings. However, it will be appreciated that the tread nosings 50A and 50B will each also be similarly formed and cut to the desired length from an elongated member which is extruded through a die similar to die 171.

The tread pan 51 comprising the step assembly 42 is also preferably formed from an elongated extruded metal member which is illustrated in FIG. 21 of the drawings and designated by the numeral 175. The elongated member 175 is extruded through an associated die 176 having a die opening 177 which corresponds to the configuration of member 175 and which has the cross-sectional configuration of pan 51. Thus, it is a simple manner to define a pan 51 merely by cutting the elongated member 175 to the desired length. The elongated member 175 has its component parts formed as an integral part thereof and for simplicity such parts have been designated by the same reference numerals as corresponding parts of the pan 51.

Any suitable metal may be utilized to form elongated members 165, 170, and 175. However, such members are preferably formed utilizing metal containing aluminum.

Reference is now made to FIG. 22 which illustrates a fragmentary portion of the die 166 and the manner of extruding a plurality of grooves 70 in the vertical leg 67 of riser 45 and to FIG. 23 which illustrates a portion of the die 171 and the manner of extruding a plurality of cooperating projections 74 in the tread nosing 50 which are adapted to be intermeshed within associated grooves 70 in the vertical leg portion 67. The manner in which a plurality of projections 74 are installed in position within associated grooves 70 is illustrated in FIG. 24 of the drawings with the vertical legs 67 and 71 of riser 45 and tread nosing 50 respectively being held together prior to mechanically deforming the projections 74 within associated groove means 70 of the riser. It will be appreciated that the vertical legs 71 and 67 are then preferably mechanically compressed together so as to deform the projections in position so that they follow the contour of associated groove means 70 as shown in FIG. 7 and previously described in connection with step assembly 42.

In the presentation of FIG. 24 the projections 74 extend from vertical leg 71 of tread nosing 50 and the slots are provided in the vertical leg 67 of riser 45. However, it will be appreciated that the arrangement of the slots and grooves may be reversed so that in effect the slots are defined in the tread nosing 50 and the projections are defined in the riser 45.

Reference is now made to FIGS. 25 through 34 which illustrate a typical few of the many possible embodiments of interlocking projections and grooves which may be provided in either the riser or the tread nosing. However, for ease of presentation the fragmentary views illustrated in FIGS. 25–34 will be similar to the presentation of FIG. 24 and will illustrate grooves in a riser shown on the right hand portion in each figure and cooperating projections in a tread nosing shown on the left hand portion prior to mechanically deforming such grooves and projections together.

Each riser of FIGS. 25–34 will be designated by the reference numeral 45 and grooves formed therein by the numeral 70; however, for each different figure a different letter designation will be used following the numeral designation. Similarly, each tread nosing of FIGS. 25–34 will be designated by the reference numeral 50 and the projections formed therein designated by the numeral 74; however, for each different figure a different letter designation will be used following the numeral designation and which is identical to the letter designation of the cooperating grooves of an associated riser.

The various projections shown in each figure are mechanically deformed within cooperating grooves and follow the contour thereof to provide a high strength connection essentially as shown in FIG. 7 for the embodiment of grooves and projections illustrated and described in connection with FIG. 2.

In the exemplary embodiments of this invention presented above the tread nosing 50 in each instance is fastened to an associated riser 45 directly and without the use of an intermediate member. However, it will be appreciated that an intermediate fastening member may be utilized and fastened to a tread nosing along one side and to a riser along its other side to provide a high structural strength attachment between the tread nosing and riser.

FIG. 35 of the drawings shows an intermediate member designated by the numeral 180 which has an elongated central portion 181 and a plurality of symmetrically arranged projections 182 arranged to extend from opposite sides of the central portion 181. The corresponding riser 45 may have its vertical leg portion 67 provided with grooves designated by the numeral 183. Similarly, the vertical leg portion 71 of the tread nosing 50 may be provided with identical grooves also designated by the numeral 183. The riser 45 and tread nosing 50 of FIG. 35 are attached together by inserting member 180 therebetween as shown in FIG. 35 and compressing such members together so as to deform each projection 182 within an associated groove 183.

The above technique enables the utilization of an intermediate fastening member which can be designed to be more efficiently deformed than if it were made integrally with the riser or tread nosing. The provision of an intermediate member 180 makes it possible to standardize on the preferred type of groove to be defined in each riser and tread nosing.

FIG. 36 illustrates another technique for fastening a riser and tread nosing wherein a plurality of projections are provided extending from both an associated vertical leg portion 67 of a riser 45 and vertical leg portion 71 of a tread nosing 50. For ease of presentation the projections have been designated by the same numeral 185 in each instance. An intermediate member 190 is utilized in connection with the presentation of FIG. 36 and intermediate member 190 in this instance has a contoured configuration defined by a plurality of grooves 186 extending inwardly from its opposite side edges. Each groove 186 is adapted to receive an associated projection 185 extending from a riser 45 or a tread nosing 50.

In each instance it will be seen that upon urging the vertical leg portion 67 of riser 45 and vertical leg portion 71 of tread nosing 50 together each projection 185 is deformed within an associated groove 186 to provide a strong mechanical connection.

Thus, it is seen that an intermediate member may be effectively utilized to interlock a pair of cooperating members of the step assembly together. Further, each intermediate member may also be economically formed as by extruding.

While present preferred embodiments of this invention have been illustrated and described, it will be recognized that this invertion may be otherwise variously embodied and practiced within the scope of the following claims.

What is claimed is:

1. In combination: a riser, a substantially L-shaped tread nosing, and a reversible pan fastened together to define a step assembly, said pan defining the central portion of a substantially horizontal tread for said step assembly in one of its positions and defining the bottom of a pan-like mold for receiving a step-forming material in its reversed position, said tread nosing having a horizontal leg which terminates in a supporting flange having an upper and a lower fastening means, said pan comprising a main portion having one end portion provided with cooperating fastening means and having an opposite end portion, so that with said cooperating fastening means fastened with said upper fastening means and said opposite end portion supported by an associated support said main portion defines said central portion of said horizontal tread, and upon reversing said pan and fastening said cooperating fastening means with said lower fastening means and with said opposite end portion supported by said support said main portion defines said bottom of said pan-like mold.

2. A combination as set forth in claim 1 in which said tread nosing comprises a plurality of integral substantially parallel spaced apart ridges extending thereacross and defining a substantially non-skid walking surface.

3. A combination as set forth in claim 1 in which said pan has a plurality of parallel spaced apart ridges provided on its outside surface as determined by said pan in said one position, said ridges defining a non-skid walking surface.

4. A combination as set forth in claim 1 in which said riser comprises a first substantially L-shaped member having a vertical leg and said tread nosing comprises a second substantially L-shaped member having a vertical leg and said horizontal leg which terminates in said supporting flange, one of said members having a groove provided in its vertical leg and the other of said members having a projection provided in its vertical leg, and said step assembly being fastened together by fastening said pan to said supporting flange using associated fastening means and fastening said riser to said tread nosing by inserting said projection within said groove.

5. A combination as set forth in claim 4 in which said riser and tread nosing are fastened together by deforming said projection within said groove.

6. A combination as set forth in claim 4 in which said pan is defined by a substantially U-shaped portion having a pair of parallel arms and an integral extension defining said main portion and extending in the opposite direction from one of its parallel arms, said extension having a cooperating flange defining said one end portion and said U-shaped portion defining said opposite end portion, and said supporting flange having upper and lower slots therein defining said upper and lower fastening means and said cooperating flange having a cooperating tongue defining said cooperating fastening means, said tongue being adapted to be fastened in a slot to hold said pan and tread nosing together.

7. A combination as set forth in claim 6 in which with said tongue in a particular slot component portions of said supporting flange defining the particular slot are deformed in firm contact against said tongue to provide a rattle-free mechanical construction.

8. A combination as set forth in claim 6 in which each slot is a substantially T-shaped slot and said cooperating tongue is a cooperating T-shaped tongue adapted to be slid along and interlocked within its associated slot.

9. A combination as set forth in claim 1 and further comprising a pair of spaced apart stringers and supports for supporting said step assembly to said stringers.

10. A combination as set forth in claim 1 and further comprising, a pair of spaced apart stringers, at least another step assembly which is substantially identical to said step assembly, and supports for supporting each step assembly to said stringers.

11. A combination as set forth in claim 1 and further comprising a pair of spaced apart stringers, each of said stringers having a substantially U-shaped configuration, at least another step assembly which is substantially identical to said step assembly, a support for supporting each end of each step assembly to an associated one of said stringers, and a single piece cover fastened between the terminal outer edges of the parallel leg portions of each of said stringers.

12. A combination as set forth in claim 1 in which, said riser comprises a substantially L-shaped member having a vertical leg, said L-shaped tread nosing is in the form of an L-shaped member having a vertical leg and said horizontal leg which terminates in said supporting flange, one of said members having at least one groove provided in its vertical leg and the other of said members having at least one projection provided in its vertical leg and said step assembly being fastened together by inserting at least one projection within an associated groove to fasten said riser and tread nosing together, and said combination further comprising a pair of spaced apart stringers, at least another step assembly which is substantially identical to said step assembly, and supports for supporting each step assembly to said stringers.

13. A combination as set forth in claim 12 in which said one member has a plurality of grooves in its vertical leg and said other member has a plurality of projections in its vertical leg in which only certain ones of said plurality of projections are inserted within associated ones of said grooves to thereby provide an adjustable vertical height for each of said step assemblies as determined by the number of projections inserted within associated cooperating grooves.

14. In combination: a riser, a tread fastened to said riser to define a step assembly, said tread being reversible and having a substantially horizontal surface in one of its positions and providing an integral pan-like mold for receiving a step-forming material in its reversed position, said tread comprising a tread nosing fastened to said riser and a reversible pan fastened to said tread nosing, said pan defining the central part of said horizontal surface in said one position and defining the bottom of said pan-like mold in its reversed position, and an intermediate fastening member adapted to be fastened to said tread nosing along one side and to said riser along the other side to provide a high structural strength attachment between said tread nosing and said riser.

15. In combination: a riser and a tread fastened together to define a step assembly, said tread being reversible and having a substantially horizontal surface in one of its positions and providing an integral pan-like mold for receiving a step-forming material in its reversed position, said tread comprising a tread nosing fastened to said riser and a reversible pan fastened to said tread nosing, said pan defining the central part of said horizontal surface in said one position and defining the bottom of said pan-like mold in its reversed position, said riser comprising a first substantially L-shaped member having a vertical leg and said tread nosing comprising a second substantially L-shaped member having a vertical leg and a horizontal leg which terminates in a supporting flange, one of said members having a groove provided in its vertical leg and the other of said members having a projection provided in its vertical leg, and said step assembly being fastened together by fasteniing said pan to said supporting flange and fastening said riser to said tread nosing by inserting said projection within said groove, said pan being defined by a substantially U-shaped portion having a pair of parallel arms and an integral extension extending in the opposite direction from one of its parallel arms, said extension having a cooperating flange, one of said flanges having a slot provided therein and the other of said flanges having a cooperating tongue adapted to be fastened in said slot to hold said pan and tread nosing together, said slot being defined as an upper slot in said supporting flange and said supporting flange having a lower slot provided therein in parallel spaced apart relation from said upper slot and disposed vertically therebeneath, said cooperating tongue comprising an interlocking tongue provided in the terminal end of said extension, so that with said tongue inserted in position within said upper slot one arm of said U-shaped portion is held against the horizontal portion of an associated substantially L-shaped riser and the other arm of said U-shaped portion is supported by an associated support, and upon reversing said pan said tongue is inserted in position within said lower slot and said one arm of said U-shaped portion is supported by said support and said other arm of said U-shaped portion is held against said horizontal portion of said associated L-shaped riser, said pan-like mold having a bottom surface defined by said extension and a pair of oppositely arranged side walls defined by said supporting flange and the bight of said U-shaped portion.

16. In combination: a pair of spaced apart substantially U-shaped stringers, each of said U-shaped stringers having a central rib extending therealong and outwardly in the same direction from the bight of the U-shaped stringer as the pair of parallel spaced apart legs defining each stringer, a plurality of step assemblies, each of said step assemblies comprising a riser and a tread fastened to said riser, said tread being reversible and having a substantially horizontal surface in one of its positions and providing an integral pan-like mold for receiving a step-forming material in its reversed position, said tread comprising a tread nosing fastened to said riser and a reversible pan fastened to said tread nosing, said pan defining the central part of said horizontal surface in said one position and defining the bottom of said pan-like mold in its reversed position, a support for supporting each end of each step assembly to an associated one of said stringers, and a cover for each of said stringers, each cover being defined by a pair of substantially U-shaped members each being snap-fitted between said central rib and an outwardly extending leg of its associated U-shaped stringer.

17. In combination: a pair of spaced apart stringers and a plurality of step assemblies, each of said step assemblies being defined by a riser and a tread fastened to said riser, said tread being reversible and having a substantially horizontal surface in one of its positions and providing an integral pan-like mold for receiving a step-forming material in its reversed position, said riser comprising a first substantially L-shaped member having a vertical leg, said tread comprising a tread nosing and a reversible pan attached thereto and defining the central part of said horizontal surface in said one position and defining said pan-like mold in said reversed position, said tread nosing comprising a second substantially L-shaped member having a vertical leg and a horizontal leg which terminates in a supporting flange, one of said members having at least one groove provided in its vertical leg and the other of said members having at least one projection provided in its vertical leg and said step assembly being fastened together by inserting at least one projection within an associated groove to fasten said riser and tread nosing together, and supports for supporting each step assembly to said stringers wherein at least one of said supports for each step assembly is defined as a protrusion extending from the vertical leg of one of said L-shaped members, said protrusion being adapted to be inserted and fastened within an associated opening in an associated stringer.

18. In combination: a pair of spaced apart stringers and a plurality of step assemblies, each of said step assemblies being defined by a riser and a tread fastened to said riser, said tread being reversible and having a substantially horizontal surface in one of its positions and providing an integral pan-like mold for receiving a step-forming material in its reversed position, said riser comprising a first substantially L-shaped member having a vertical leg, said tread comprising a tread nosing and a reversible pan attached thereto and defining the central part of said horizontal surface in said one position and defining said pan-like mold in said reversed position, said tread nosing comprising a second substantially L-shaped member having a vertical leg and a horizontal leg which terminates in a supporting flange, one of said members having at least one groove provided in its vertical leg and the other of said members having at least one projection provided in its vertical leg and said step assembly being fastened together by inserting at least one projection within an associated groove to fasten said riser and tread nosing together, and supports for supporting each step assembly to said stringers wherein at least one of said supports for each step assembly comprises a fastening screw fastened to an L-shaped member and to an associated stringer.

19. In combination: a riser, a substantially L-shaped tread nosing, and a reversible pan fastened together to define a step assembly, said pan defining the central portion of a substantially horizontal tread for said step assembly in one of its positions and defining an integral pan-like mold for receiving a step-forming material in its reversed position, said tread nosing comprising, a vertical leg portion and a horizontal leg portion which terminates in a supporting flange having an upper and a lower fastening means, said vertical leg portion comprising a single rectilinear member having a plurality of spaced projections extending outwardly from one of its vertical surfaces and across the full length thereof, each of said projections being adapted to be intermeshed and mechanically deformed within an associated cooperating groove of an adjoining member of said step assembly, and said projections enabling the vertical distance between adjacent horizontal treads of a stairway to be incrementally adjusted, said pan comprising a main portion having one end portion provided with cooperating fastening means and having an opposite end portion, so that with said cooperating fastening means fastened with said upper fastening means and said opposite end portion supported by an associated support said main portion defines said central portion of said horizontal tread, and upon reversing said pan and fastening said cooperating fastening means with said lower fastening means and with said opposite end portion supported by said support said main portion defines a bottom of said pan-like mold.

20. A combination as set forth in claim 19 in which said adjoining member comprises a portion of said riser having a plurality of cooperating grooves defined therein.

21. In combination: a riser, a substantially L-shaped tread nosing, and a reversible pan fastened together to define a step assembly, said pan defining the central portion of a substantially horizontal tread in one of its positions and providing an integral pan-like mold for receiving a step-forming material in its reversed position, said tread nosing comprising, a vertical leg portion and a horizontal leg portion which terminates in a supporting flange, said vertical leg portion comprising a single rectilinear member having a plurality of spaced projections extending outwardly from one of its vertical surfaces and across the full length thereof, each of said projections being adapted to be intermeshed and mechanically deformed within an associated cooperating groove of an adjoining member of said step assembly, said projections enabling the vertical distance between adjacent horizontal treads of a stairway to be incrementally adjusted, said combination further comprising an intermediate fastening member defining said adjoining member said intermediate member having a plurality of cooperating grooves defined therein and said intermediate member being fastened against said one vertical surface of said tread nosing along one side thereof and to said riser along its other side to provide a high structural strength attachment between said tread nosing and said riser.

22. In combination: a riser, a substantially L-shaped tread nosing, and a reversible pan fastened together to define a step assembly, said pan defining the central portion of a substantially horizontal tread in one of its positions and providing an integral pan-like mold for receiving a step forming material in its reversed position, said tread nosing comprising, a vertical leg portion and a horizontal leg portion which terminates in a supporting flange, said vertical leg portion having a plurality of projections extending the full length thereof and each of said projections being adapted to be intermeshed with an associated cooperating groove of an adjoining member of said step assembly, said projections enabling the vertical distance between adjacent horizontal treads of a stairway to be incrementally adjusted, said tread nosing being made by cutting an elongated extruded member to length and having said plurality of projections provided in said vertical leg portion as an integral part thereof, said supporting flange extending substantially vertically downwardly beneath said horizontal leg portion in substantially parallel relation to said vertical leg portion, said supporting flange having an upper and a lower slot provided therein across the full length thereof in parallel spaced apart relation, and said pan being defined by a substantially U-shaped portion having a pair of parallel arms and an integral extension extending in the opposite direction from one of its parallel arms, said extension having a cooperating interlocking tongue provided in the terminal end thereof which is adapted to be fastened in position in an associated one of said slots to hold said pan and tread nosing together, so that with said tongue inserted in position within said upper slot one arm of said U-shaped portion is held against a horizontal portion of an associated riser and the other arm of said U-shaped portion is supported by an associated support and upon reversing said pan to provide said pan-like mold said tongue is inserted in position within said lower slot and said one arm of said U-shaped portion is supported by said support and said other arm of said U-shaped portion is held against said horizontal portion of said riser, said pan-like mold having a bottom surface defined by said extension and a pair of oppositely arranged side walls defined by said supporting flange of said tread nosing and the bight of said U-shaped portion.

References Cited

UNITED STATES PATENTS

| | | | |
|---|---|---|---|
| 853,134 | 5/1907 | Steiber | 52—182 |
| 1,412,899 | 4/1922 | Smith | 52—188 |
| 1,991,016 | 2/1935 | Fahrenwald | 52—588 |
| 2,926,928 | 3/1960 | Bennett | 52—579 |
| 3,022,857 | 2/1962 | Rich | 182—228 |
| 3,381,775 | 5/1968 | Livers | 182—228 |

FOREIGN PATENTS

| | | | |
|---|---|---|---|
| 742,850 | 9/1966 | Canada | 52—595 |
| 953,706 | 3/1964 | Great Britain | 52—732 |

FRANK L. ABBOTT, Primary Examiner

L. A. BRAUN, Assistant Examiner

U.S. Cl. X.R.

52—179, 181, 188; 182—228